D. M. Mefford,
Preserving Fruits,
Nº 82,429. Patented Sept. 22, 1868.
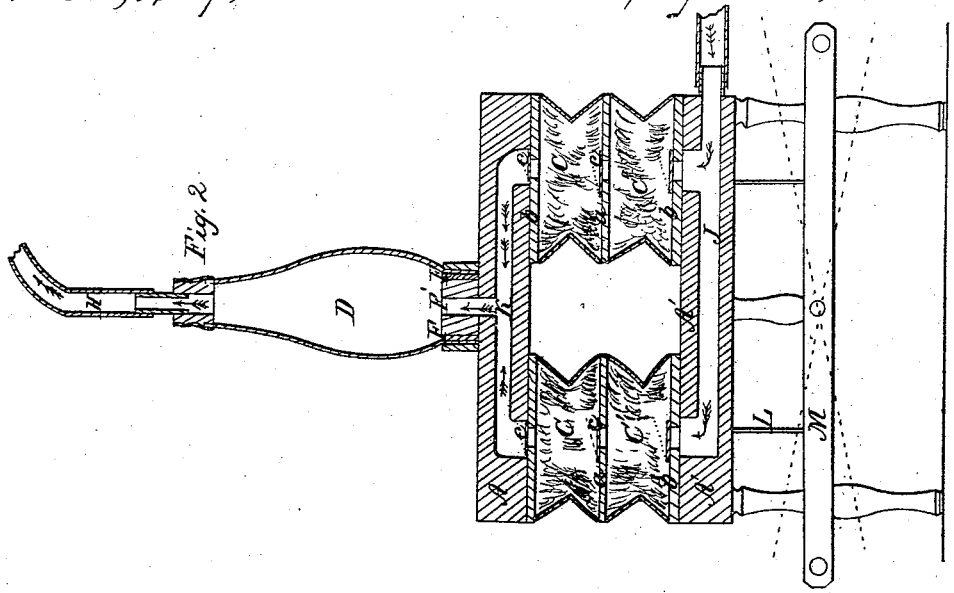
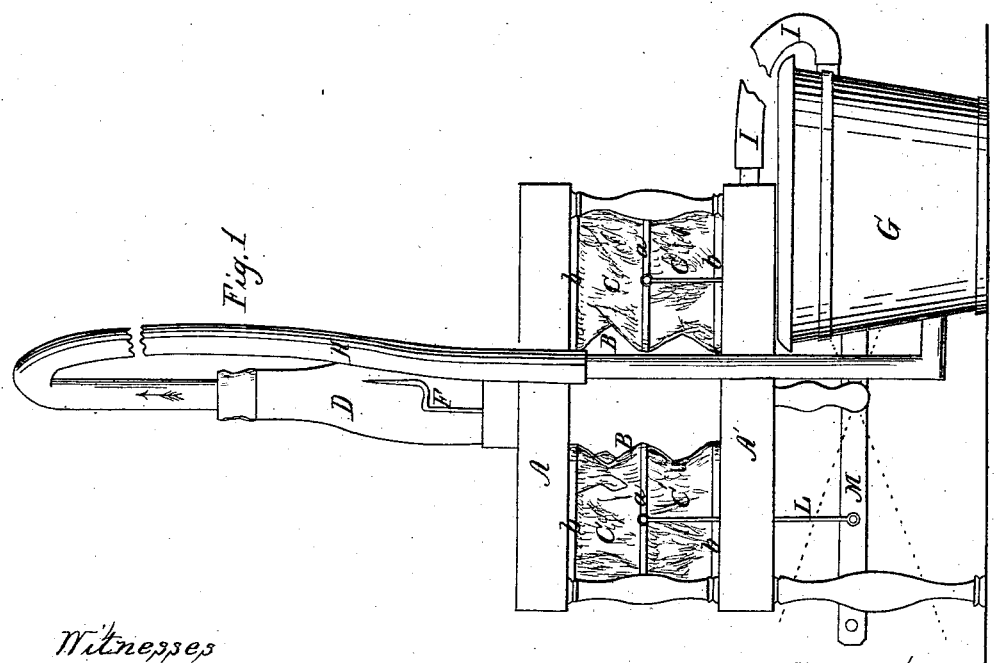
Witnesses
J. H. Burridge
Frank. S. Alden
Inventor
D. M. Mefford

UNITED STATES PATENT OFFICE.

DAVID M. MEFFORD, OF NORWALK, OHIO, ASSIGNOR TO HIMSELF AND STEPHEN BOALT.

IMPROVEMENT IN PRESERVING FRUIT.

Specification forming part of Letters Patent No. 82,429, dated September 22, 1868.

*To all whom it may concern:*

Be it known that I, D. M. MEFFORD, of Norwalk, in the county of Huron and State of Ohio, have invented certain new and useful Improvements in the Mode of Preserving Fruit; and I do hereby declare that the following is a full and complete description of the same, reference being had to the accompanying drawings making part of this specification, in which—

Figure 1 is a side view of the apparatus. Fig. 2 is a vertical section.

Like letters of reference refer to like parts in the different views presented.

The nature of my improvement relates to, first, subjecting fruits in their raw or uncooked condition to the action of sulphurous-acid gas; and, secondly, scalding or heating them to the boiling-point in order to prevent fermentation, although exposed to the atmosphere, and to eliminate any excess of sulphurous-acid gas which may have combined with the fruit.

A description of an apparatus for thus treating fruit for preservation is as follows:

A and A' represent an upper and lower table, arranged as shown. B B are the bellows or air-pumps, which are made in two sections, C C', the same being separated by the diaphragm *a*. In this diaphragm, and also in the upper and lower heads *b b*, are the valves *c*, all opening upward, as indicated by the dotted lines *d*, and are for a purpose hereafter shown. D represents a chamber, in which is fixed the hook E. This chamber is designed to fit firmly over the gasket F on the table F', which is secured to the table A. Leading from the chamber to the lower part of the vessel G is the tube or hose H, and from the upper part of the vessel G is the hose I, leading to the lower table A'. In this table is the conduit J, with which this hose connects. In the upper table A is a similar conduit, K, connecting with the chamber D.

The manner in which this apparatus is used is as follows: A wick of any flocculent material may be prepared by charging or saturating it with sulphur. It is then hung on the hook E and ignited, the fruit having been previously prepared and placed in the vessel G in its raw condition. This vessel is provided with a close cover, and is perfectly tight. The bellows B are worked by means of the rods L and lever M, and are kept in constant motion, so that a perfect circulation may be kept up. The ignition of the sulphur creates a sulphurous vapor. This, combining with the oxygen, creates a sulphurous-acid gas. The current from the bellows carries this into the hose H, and thence into the vessel G, where it permeates the fruit. After it has passed through the fruit it enters the tube I at the top of the vessel, and thence into the conduit J, where it is drawn, by the alternate action of the bellows, into the sections C. The valves, all opening upward, will close and prevent any of the gas passing back, but a complete and continuous circulation is established throughout the whole apparatus, and thoroughly permeating the fruit contained in the vessel.

The peculiar feature of subjecting the fruit to the action of the gas is that all is reached and acted upon by the gas, which enters the cells of the fruit. This insures a complete diffusion of the antiseptic throughout its tissues; whereas, if it is treated subsequent to scalding, the gas could only reach the surface of the mass.

The treating subsequent to treatment eliminates all the gas that is not incorporated with the properties of the fruit, thus preventing any gaseous, sulphurous taste, and the acid-gas incorporated with the fruit is merged in its acid.

The heating process after the action of the sulphurous-acid gas serves to expel the incipient elements of fermentation. It also diffuses the gas still more throughout the tissues of the fruit.

One important influence or effect of sulphurous-acid gas upon raw fruit is to toughen its fibers, so that, although it should subsequently be heated, it will retain its original form and shape, as the tissues are hardened by its action. It also serves to neutralize the effect of the decomposing agents in their tendency to degrade the fruit.

Fruit treated in this manner need not be sealed in order to be kept, but will remain without decomposing in open vessels.

This method of treating fruit admits of various modifications in the apparatus other than that herein described.

What I claim as my invention, and desire to secure by Letters Patent, is—

1. Preserving fruit by treating or charging the same with sulphurous-acid gas, and then subjecting it to heat, in the manner set forth.

2. Charging raw fruit with sulphurous-acid gas, preparatory to its being heated, by means of air-pumps or bellows, substantially as set forth.

DAVID M. MEFFORD.

Witnesses:
W. H. BURRIDGE,
E. E. WAITE.